April 3, 1934.   E. A. ROCKWELL   1,953,366
DECELERATING DEVICE
Original Filed March 4, 1926   11 Sheets-Sheet 1

Inventor
Edward A. Rockwell
By his Attorneys
Prindle, Wright, Neal & Bean

April 3, 1934.  E. A. ROCKWELL  1,953,366
DECELERATING DEVICE
Original Filed March 4, 1926   11 Sheets-Sheet 2
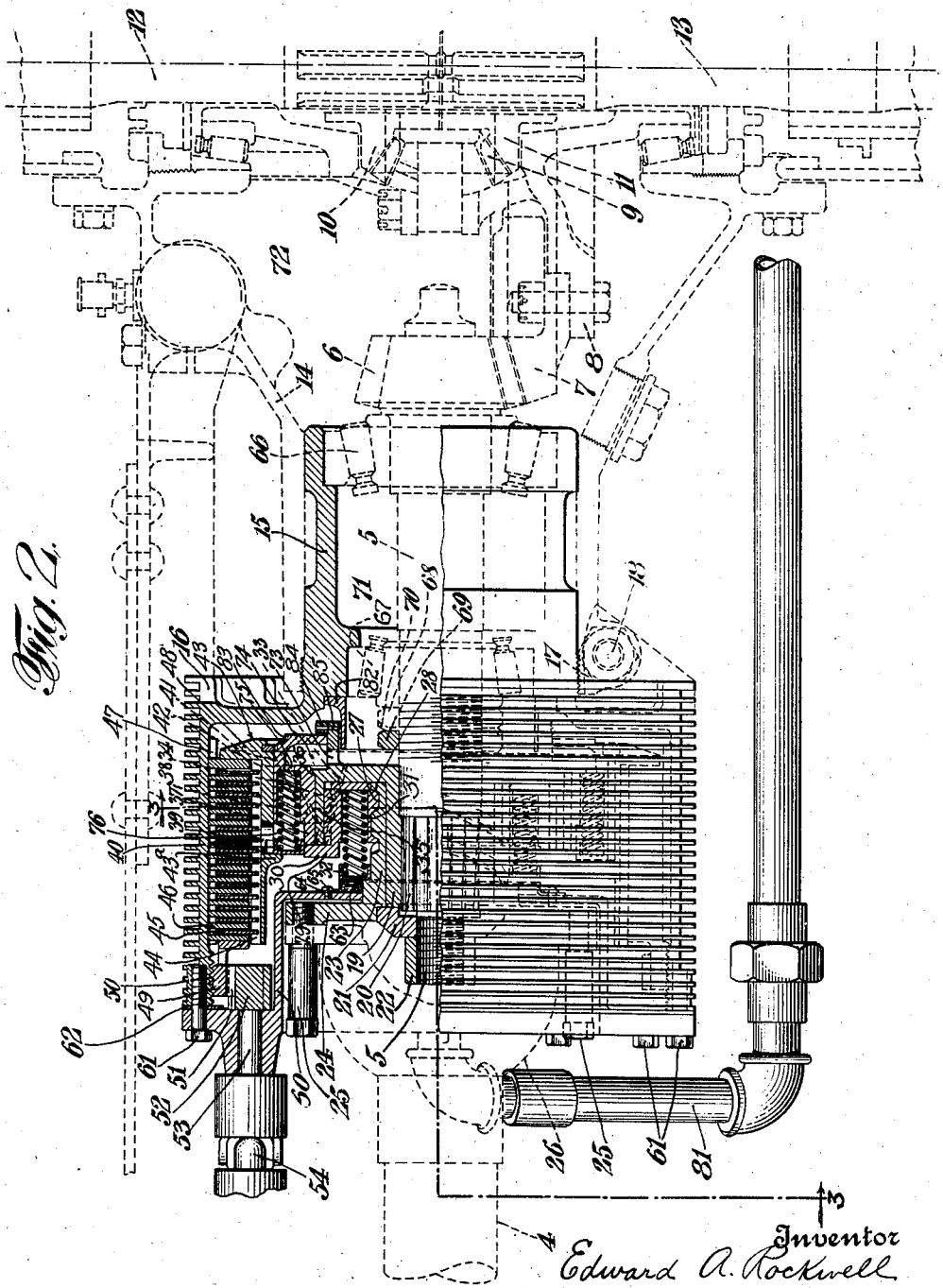

April 3, 1934.  E. A. ROCKWELL  1,953,366
DECELERATING DEVICE
Original Filed March 4, 1926   11 Sheets-Sheet 3

Inventor
Edward A. Rockwell
By his Attorneys
Prindle, Wright, Neal & Bean

April 3, 1934.  E. A. ROCKWELL  1,953,366
DECELERATING DEVICE
Original Filed March 4, 1926  11 Sheets-Sheet 4

Inventor
Edward A. Rockwell
By his Attorneys
Prindle, Wright, Neal & Bean

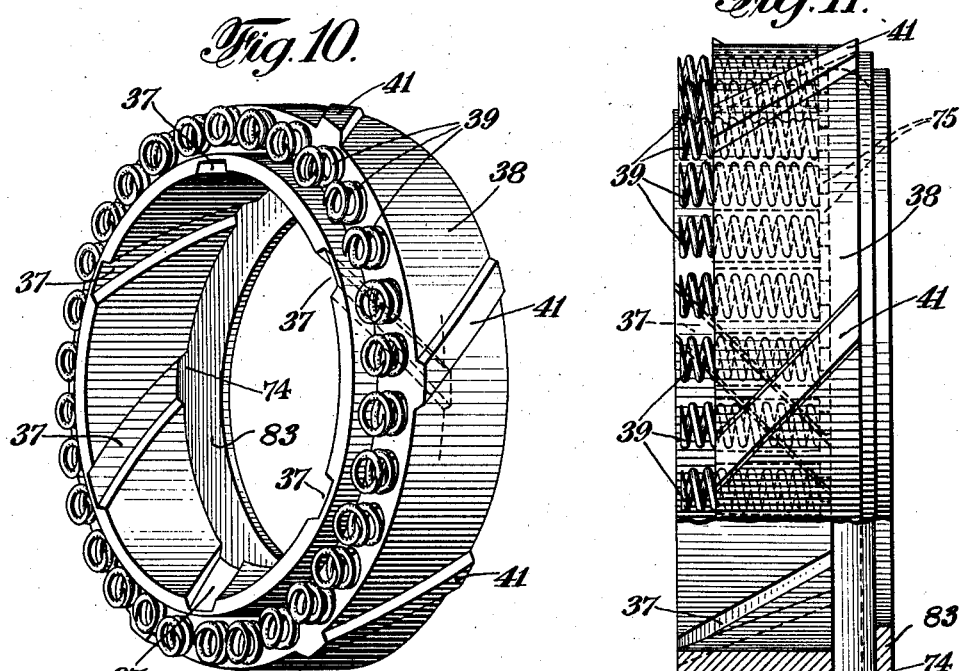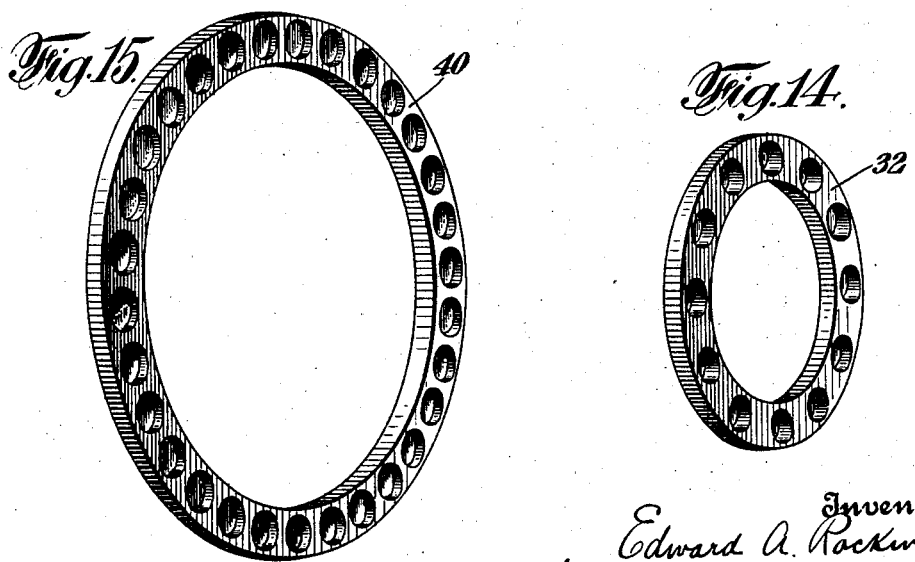

April 3, 1934.   E. A. ROCKWELL   1,953,366
DECELERATING DEVICE
Original Filed March 4, 1926   11 Sheets-Sheet 6
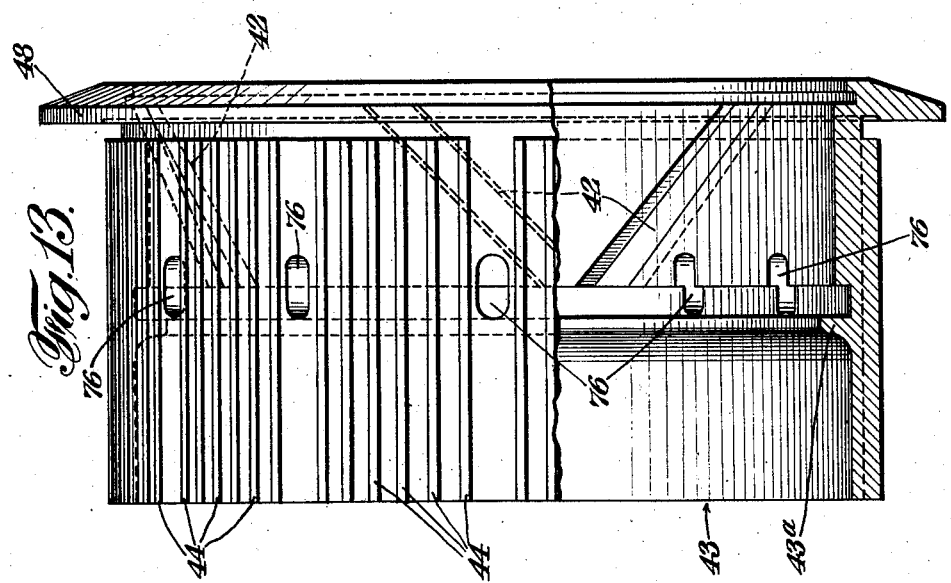
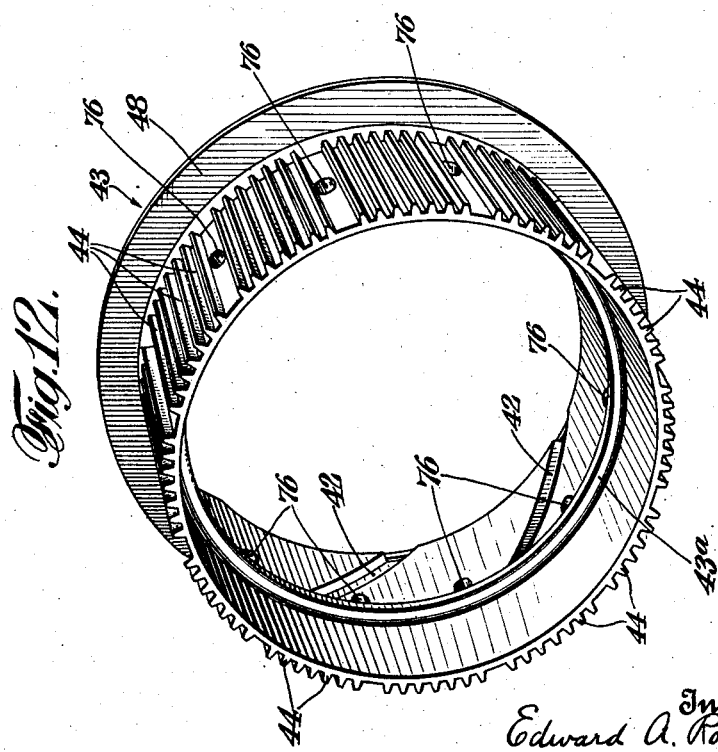
Inventor
Edward A. Rockwell
By his Attorneys
Prindle, Wright, Neal & Bean April 3, 1934.  E. A. ROCKWELL  1,953,366
DECELERATING DEVICE
Original Filed March 4, 1926   11 Sheets-Sheet 7
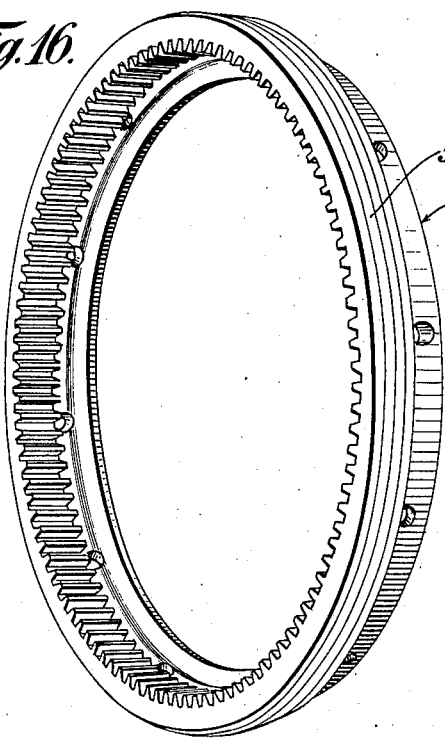
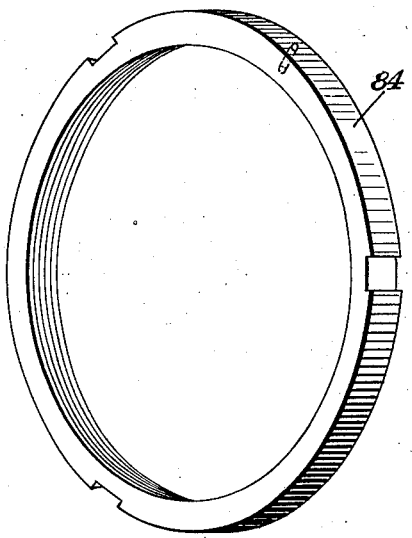
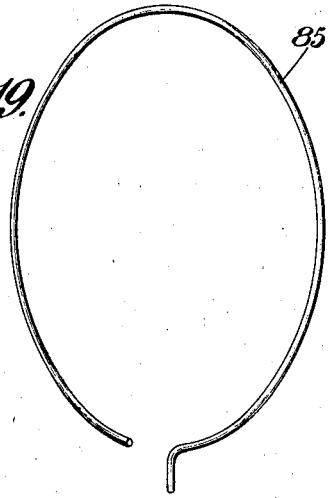
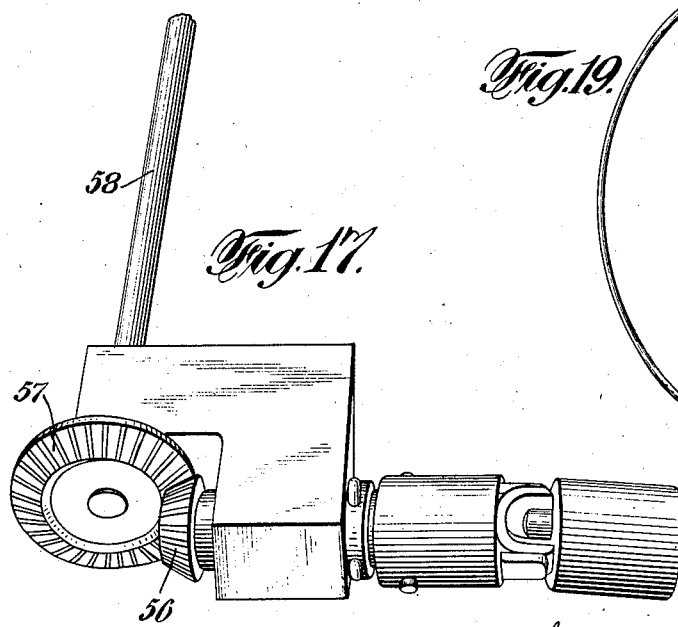
Inventor
Edward A. Rockwell
By his Attorneys
Prindle, Wright, Neal & Bean April 3, 1934. E. A. ROCKWELL 1,953,366
DECELERATING DEVICE
Original Filed March 4, 1926   11 Sheets-Sheet 8
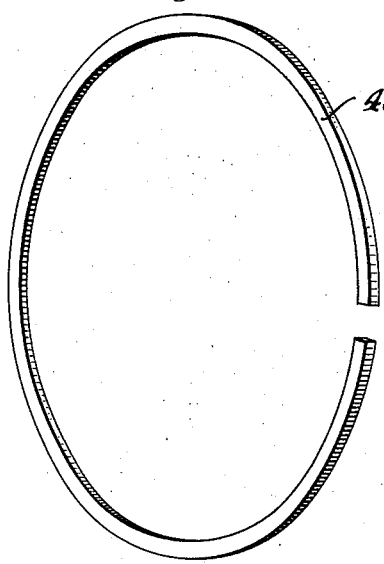
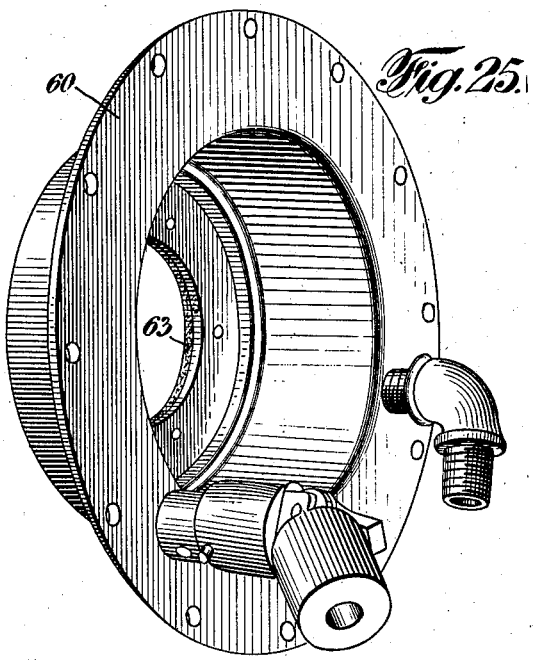
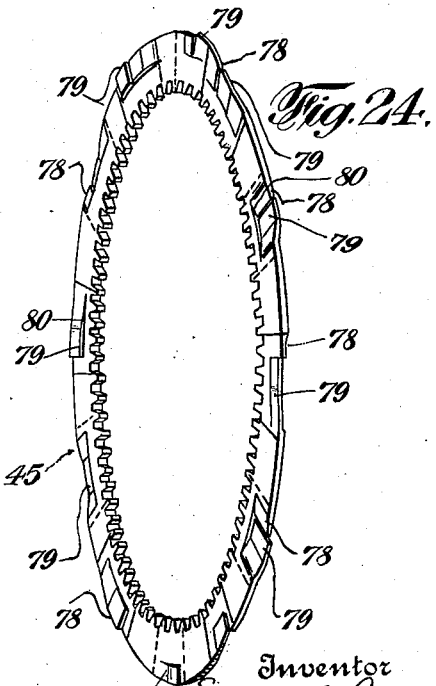
Inventor
Edward A. Rockwell
By his Attorneys
Prindle Wright, Neal & Bean April 3, 1934.  E. A. ROCKWELL  1,953,366
DECELERATING DEVICE
Original Filed March 4, 1926  11 Sheets-Sheet 9

Inventor
Edward A. Rockwell
By his Attorneys
Prindle, Wright, Neal & Bean

April 3, 1934.  E. A. ROCKWELL  1,953,366
DECELERATING DEVICE
Original Filed March 4, 1926   11 Sheets-Sheet 10

Inventor
Edward A. Rockwell
By his Attorneys
Prindle, Wright, Neal & Bean.

April 3, 1934.   E. A. ROCKWELL   1,953,366
DECELERATING DEVICE
Original Filed March 4, 1926   11 Sheets-Sheet 11
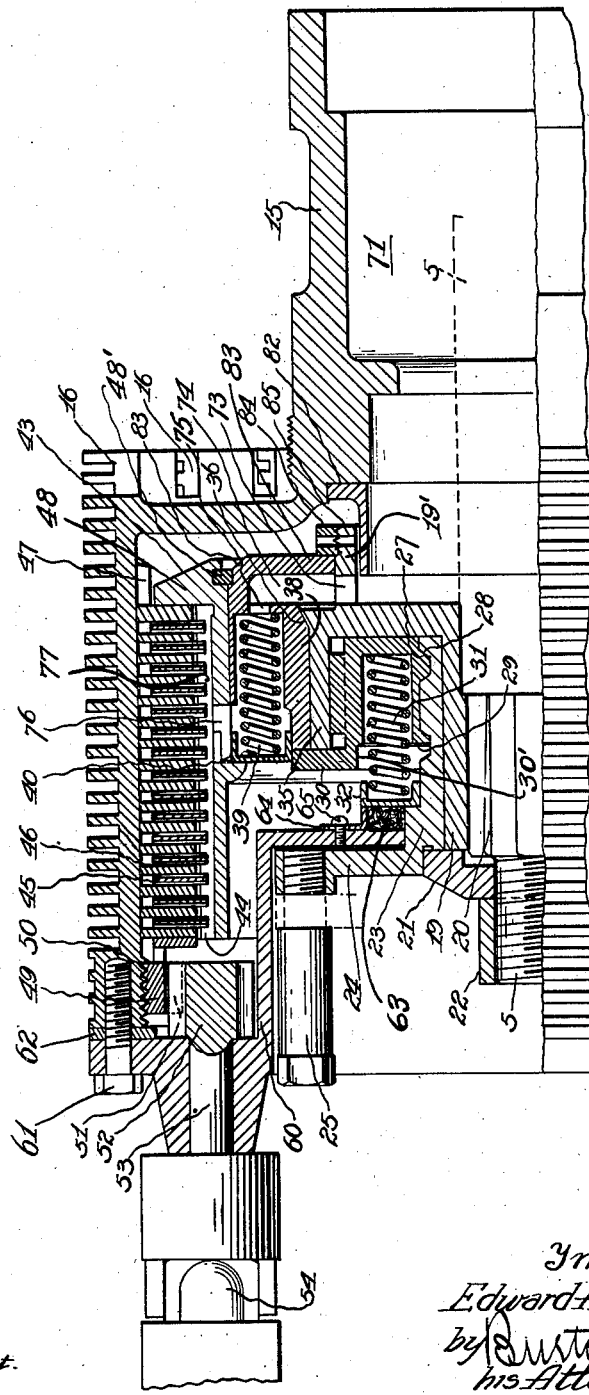

Patented Apr. 3, 1934

1,953,366

UNITED STATES PATENT OFFICE 1,953,366

DECELERATING DEVICE

Edward A. Rockwell, Chicago, Ill.

Application March 4, 1926, Serial No. 92,132
Renewed July 10, 1929

55 Claims. (Cl. 188—134)

My invention relates to an apparatus designed for deceleration of moving parts, but has especial application to the deceleration of vehicles, as, for example, automobiles, elevators, etc.

The subject matter of this application is an improvement over the decelerator as set forth in my application thereon, Serial No. 696,495, filed March 3, 1924 refiled as Serial No. 256,745, February 24, 1928.

In particular, the object of my invention is to provide an apparatus of this kind in which one of the important features is a torque release, that is to say, mechanism for causing the apparatus to operate so as not to exceed a maximum torque value notwithstanding any changes which might occur in the braking effect of any particular braking surface therein and, therefore, irrespective of any changes of properties of the oil or other liquid between the braking surfaces. One of my objects is thus to provide means for compensating for any changes in the friction characteristics of any particular oil used, as well as oils of different kinds. Accordingly, even the oil itself may change in viscosity, etc. during the operation of the brake without affecting the maximum torque release value. It is to be understood, however, that in my apparatus, as will be hereinafter seen, I have provided means for adjusting the torque value normally attained so as to control the degree of braking effect ordinarily effective in the operation of the vehicle, etc.

One of the important objects of my invention is to provide an apparatus of this character which will apply the braking effect to a moving vehicle when the momentum of the vehicle causes the same to outrun the speed of the driving means, as, for example, an internal combustion engine as applied to an automobile. A further object is to arrange the decelerating device in such a way as to be compactly carried upon the propeller shaft of an automobile. Again, one of the objects is to not only provide an oil bath in which the parts operate, but to connect the interior of the decelerating device with the differential casing so as to cause a circulation of the oil through the decelerating device in the operation of the automobile. Also, it is to be understood that by throwing the clutch of the car out, the car will come to a complete stop as a result of this brake being in action before the clutch is thrown out. Further objects are to provide means whereby the braking device may be adjusted so as to throw it entirely out of action, if desired, or so as to bring into action the full braking effect when the car is at rest, so as to effectively lock the car. It will be understood, furthermore, that my apparatus may be used with or without any of the other types of brakes now known, although I prefer to use my decelerating device either alone or in conjunction with hand- or foot-operated front-wheel brakes on an automobile. In this connection, it will be understood, also, that in the operation of an automobile equipped with my device the mere decrease in the speed of the engine, as for example, by releasing the foot rapidly either partly or wholly from the accelerator lever, will automatically bring the brake into action so as to slow down the speed of the vehicle to the speed of the driving means. One effect of this, as will be readily seen, is that the car will be slowed down in a very much shorter space of travel and in a much shorter period of time than if it were necessary to bring the brake into action by a separate additional movement of the hand or foot after the release of the accelerator lever. Also, by braking from the transmission and omitting the braking effect applied to the rear wheels, skidding is effectively eliminated. The skidding effect is eliminated as the brake is actuated only by the traction obtained at the periphery of the wheels and when skidding commences, this traction is reduced until only so much tractive effect takes place to operate the brake, depending on the road surface. Slowing or stopping on curves is feasible in the practical operation of a car therewith, also.

Further objects of my invention will appear from the detailed description of the same hereinafter.

While my invention is capable of embodiment in many different forms for the purpose of illustration I have shown only one form of the same in the accompanying drawings, in which—

Figure 2 is a plan view partly in section, showing the said device;

Figure 10 is a perspective view of the torque release member showing the torque release springs;

Figure 11 is a side elevation of the same partly in section;

Figure 12 is a perspective view of the inner disk-carrying member;

Figure 3 is a side elevation of the same partly in section;

Figure 14 is a perspective view of the drag release spring seat ring;

Figure 15 is a perspective view of the torque release spring seat ring;

Figure 16 is a perspective view of the adjustable stop ring which is adapted to be threaded into the brake housing;

Figure 17 is a perspective view of the manual adjusting device;

Figure 18 is a perspective view of the stop ring which is adapted to be threaded on to the rear end of the inner driven shaft actuating member to serve as a stop for the rearward travel of the torque release member;

Figure 19 is a perspective view of the lock wire which is adapted to lock the stop ring in place;

Figure 20 is a perspective view of the snap ring which is adapted to seat in a groove of the disk-carrying member to serve as a stop in the forward travel of the same;

Figure 23 is a perspective view of one of the castiron braking plates;

Figure 24 is a perspective view of one of the steel braking plates;

Figure 25 is a perspective view of the casing cover;

Figure 29 is a section comprising the sectional part of Figure 2 on an enlarged scale.

Figure 1:
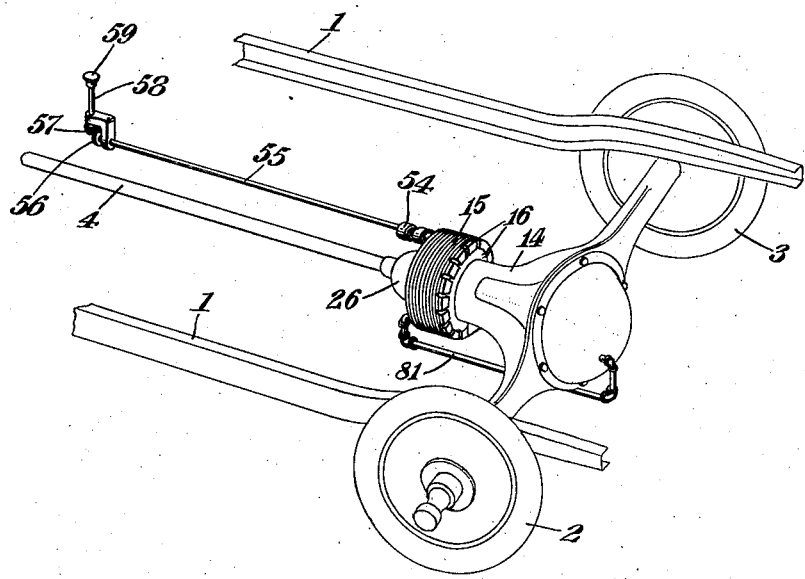
Figure 1 is a diagrammatic perspective view of an automobile chassis equipped with my decelerating device.
Figure 4:
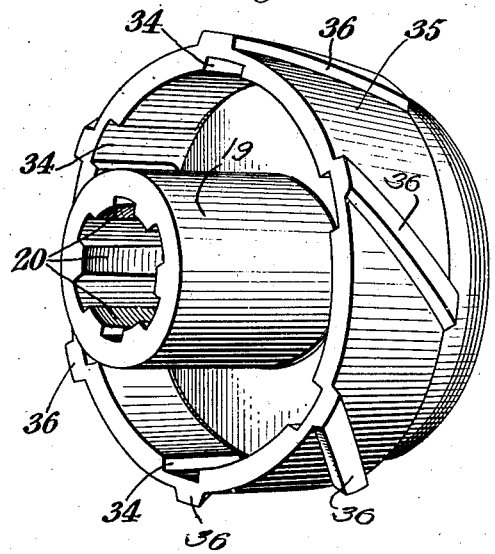
Figure 4 is a perspective view of the inner actuating member which is adapted to be attached to the driven shaft.
Figure 5:
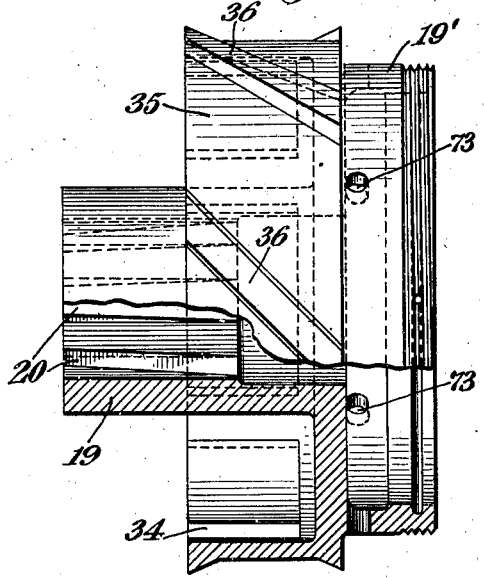
Figure 5 is a side elevation of the same partly in section.
Figure 3:
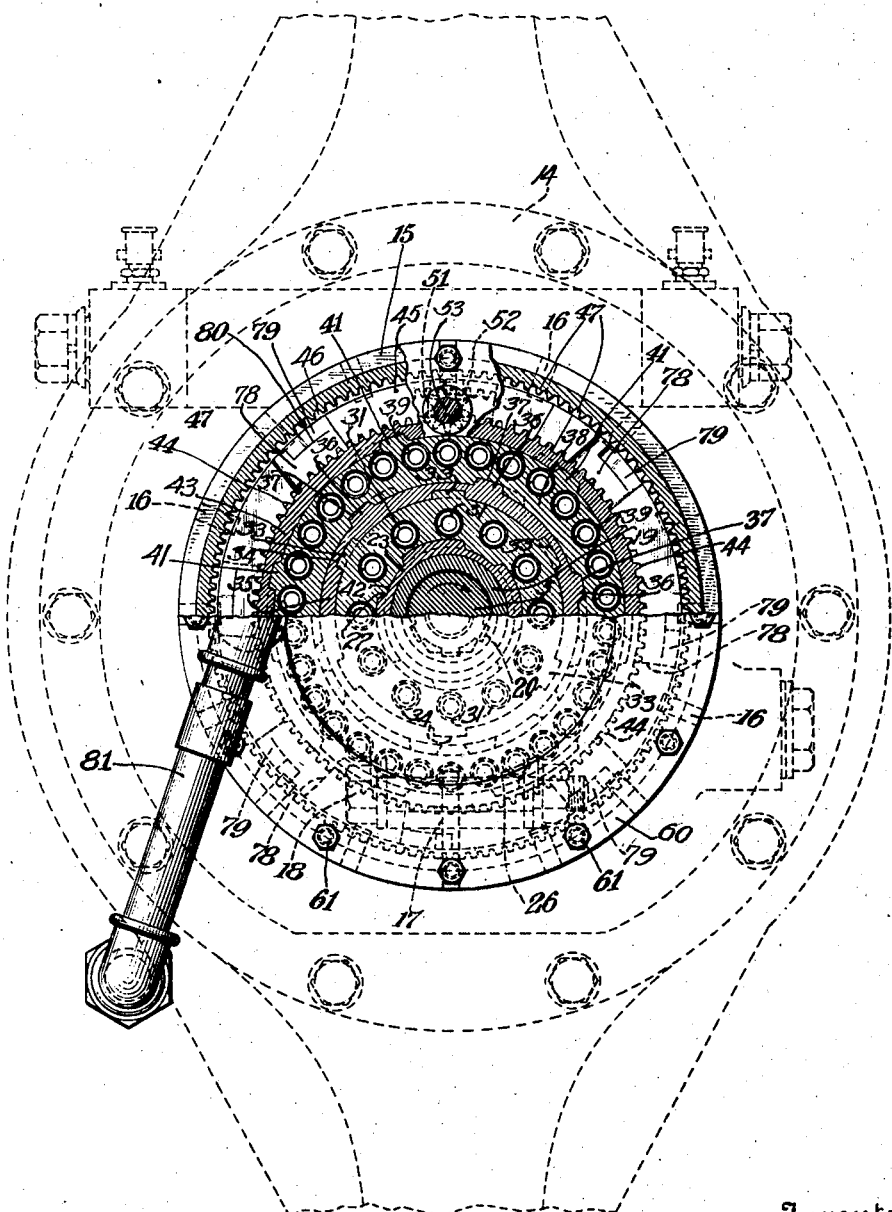
Figure 3 is a cross-section of said device.
Figure 6:
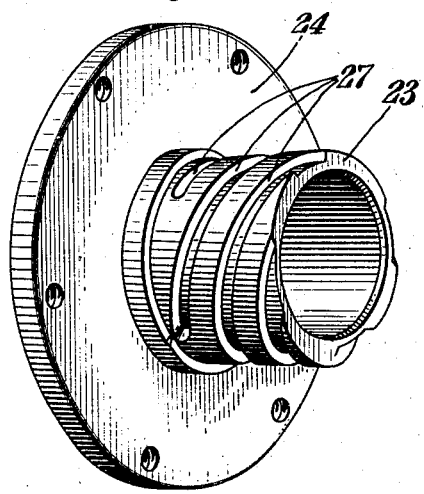
Figure 6 is a perspective view of the driving shaft actuating member.
Figure 7:
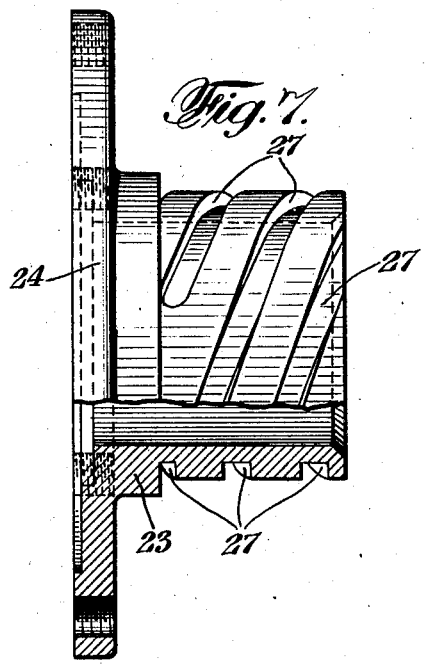
Figure 7 is a side elevation of the same partly in section.
Figure 8:
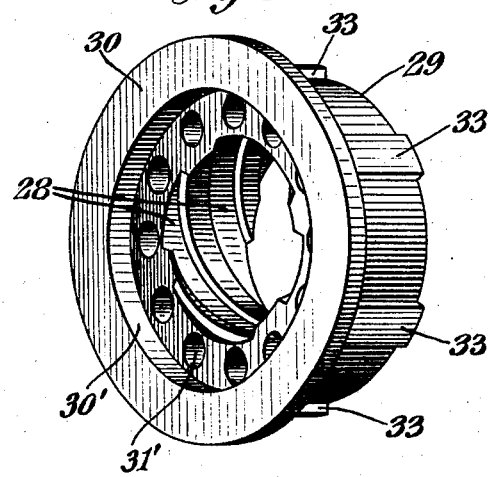
Figure 8 is a perspective view of the stop member carrying the drag release springs.
Figure 9:
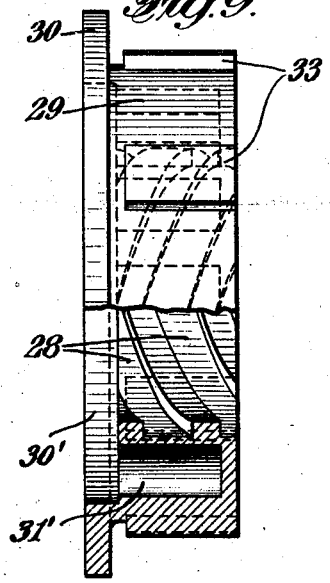
Figure 9 is a side elevation of the same partly in section.
Figure 21:
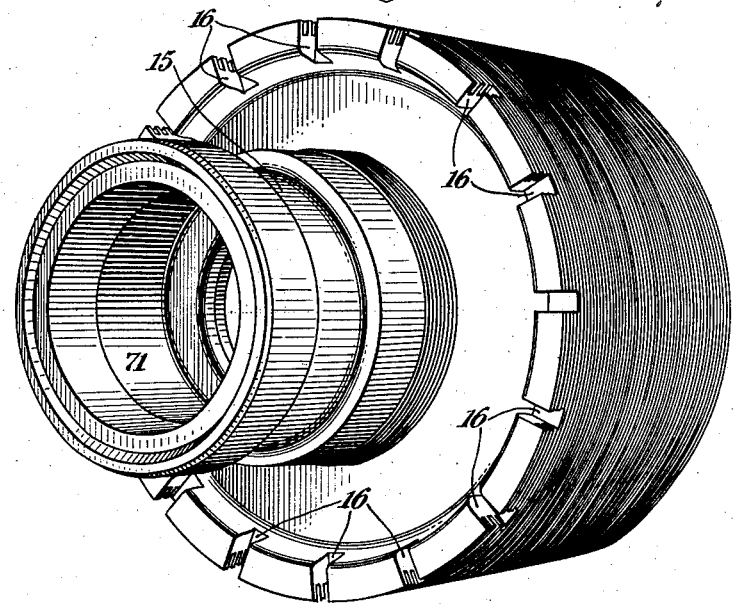
Figure 21 is a perspective view of the brake housing.
Figure 22:
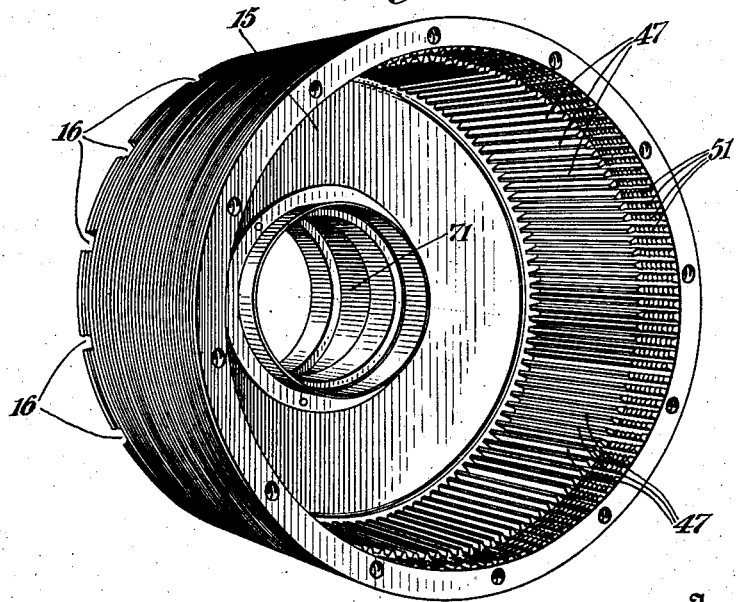
Figure 22 is another perspective view of the brake housing.
Figure 26:
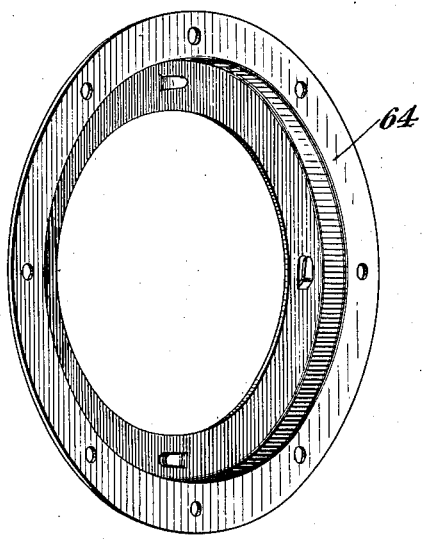
Figure 26 is a perspective view of the felt oil-seal retainer.
Figure 28:
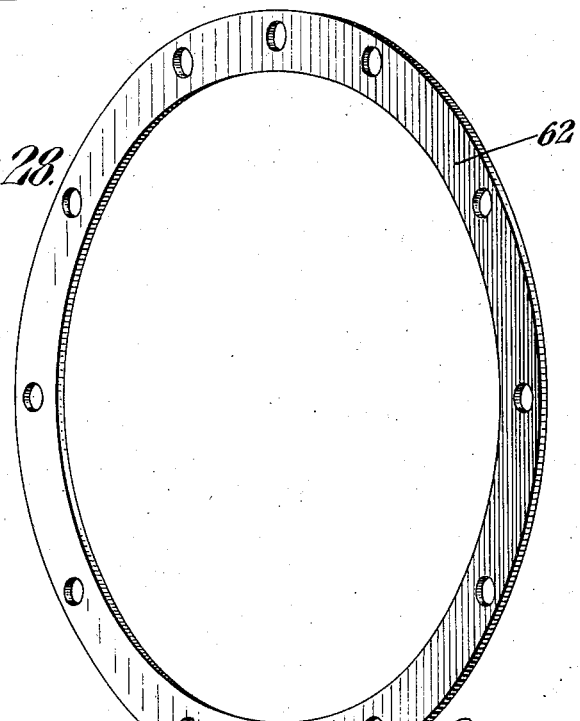
Figure 28 is a perspective view of the casing gasket.

In the drawings I have shown an automobile chassis 1, having in addition to front wheels, rear wheels 2 and 3 thereon, which may be driven in any suitable manner by an internal combustion engine or other source of power, so as to provide power for the same through a driving shaft 4. A driven shaft 5, which is in alignment therewith and driven therefrom, has the usual differential connections with the rear wheels 2 and 3 of the automobile, as, for example, through a pinion 6 carried by the driven shaft which meshes with a crown gear 7 carried by a spider 8 having a number of beveled pinions 9 thereon meshing with beveled gears 10 and 11 carried by rear axles 12 and 13 respectively of the automobile. The differential gears are carried in the usual type of gear-casing 14, in which there is screw-threaded a brake casing 15, said casing 15 (Figures 21 and 22) having slots 16 to receive a key 17 in the proper adjusted position of the brake casing 15 with regard to the differential casing 14, so as to provide the gears 6 and 7 with the proper relative position. A bolt 18 holds the key 17 tightly in place. On the forward end of the driven shaft 5 there is non-rotatably secured an inner actuating member 19 (Figures 4 and 5) which is held in place by tapered splines 20. Said shaft also carries on its extreme front end a flanged washer 21 and a nut 22. The flanged washer 21 not only holds the inner actuating member 19 in place, but, also, holds in place for rotation on the said member 19, a driving shaft actuating member 23 (Figures 6 and 7) having a flange 24 which is connected by screws 25 to a dome-shaped universal 26 secured to the driving shaft 4. The outer surface of the driving shaft actuating member 23 has a left-hand spiral 27 cut thereon to cooperate with a like spiral 28 carried by a stop member 29 (Figures 8 and 9) having a flange 30 for stopping the movement of the parts as hereinafter referred to. Said stop member 29, furthermore, is recessed for a short distance at its rearward end as at 30' and provided with openings 31' to receive a plurality of drag release springs 31 which are supported at their outer ends by means of a spring seat ring 32 (Figure 14) supported on the driving shaft actuating member 23. The stop member is limited in its rearward movement by engaging the annular flange of the inner actuating member 19, as clearly illustrated in Figure 29, and is limited in its movement in a forward direction by the spring seat ring 32 which is received in the recessed portion of the stop member. On its outer surface the said stop member 29, furthermore, has a plurality of straight longitudinal splines 33 fitting into similar grooves 34 on the inner face of a drum 35, forming a part of the inner actuating member 19 that is splined on the driven shaft 5. Said drum, furthermore, has a right-hand spiral 36 on its outer face meshing with a similar spiral 37 on the inner face of a torque release member 38 (Figures 10 and 11) having a plurality of torque release springs 39 therein which are carried at their other ends in a spring seat ring 40 supported upon the outside of the flange 30. Said torque release member 38 is in turn provided on its outer surface with a left-hand spiral 41 meshing with a similar spiral 42 on the inner face of a disk-carrying member 43 (Figures 12 and 13). The disk carrying member 43 has an inner flange 43a to form a lateral support for the spring seat ring 40, and has, also, a series of longitudinal splines 44 thereon to carry a plurality of steel plates 45 (Figure 24), which alternate with a series of castiron plates 46 (Figure 23) similarly carried upon splines 47 on the interior of the brake casing 15 (Figures 21 and 22). By using alternately placed steel and castiron plates the tendency of particles of one metal to adhere to the plates of the other metal is obviated. At one end the said plates 45 and 46 are supported against a flange 48 on the disk-carrying member 43 and at the other end they are supported against an adjusting ring 49 (Figure 16) having an external screw-thread 50 internally-threaded into the casing 15 and internal gear teeth 51 which mesh with a gear 52 carried by a shaft 53. The shaft 53 is connected by a universal joint 54 to a shaft 55 which may be operated by means of beveled gears 56 and 57 from a shaft 58 carrying a hand-wheel 59 located at a point where it may be readily reached by the driver of the automobile, as, for example, in the floor of the car in front of the driver's seat. The said shaft 53 is supported in a cover 60 (Figure 25) for the brake-casing 15, which is secured by screws 61, a tight joint being provided by a gasket 62 (Figure 28) between the parts. At the inside of the cover 60 there is supported a felt washer 63 held in place by a flanged retainer 64 (Figure 26) secured to the inside of the cover 60 by screws 65.

Figure 27:
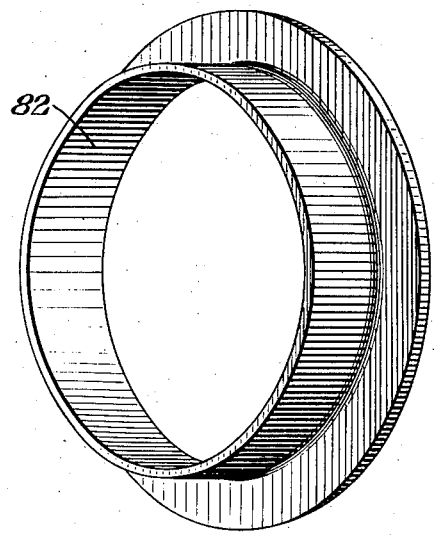
Figure 27 is a perspective view of the oil retainer ring.

At the middle of the driven shaft 5 there are provided the usual roller bearings 66 and 67 secured in place by lock-nuts 68 and 69, having between them a locking ring 70 adapted to be bent over, as shown in Figure 2, so as to prevent one of the two nuts 68 and 69 from being moved without moving the other. It will be noted that around this part of the driven shaft 5 there is located a chamber 71 forming a passageway for the circulating oil passing from a chamber 72 in the interior of the differential to the brake. The oil, which may be of any desired character for this purpose but which is preferably a medium weight lubricating oil, passes forwardly in the said chamber 71 due to the rotation of the crown gear 7, and after passing through the bearings 66 and 67, is thrown outwardly by the centrifugal action through passageways 73 (Figure 5) in the inner actuating member 19 into an annular chamber 74 and thence through ports 75 and through the springs 39 outwardly through holes 76 (Figures 12 and 13) in the plate carrying member 43 into transverse passages 77 beneath the steel braking plates 45 and thence outwardly through radial passages 78 in the brake rings 45. These passages 78 enable the oil to be fed to the surfaces of the brake rings in the rotation of the same. The oil may then flow transversely through slots 77' in the periphery of the cast iron braking plates 46. In order to insure the circulation of the oil and to normally separate the brake rings, the steel rings are provided at intervals around the periphery of the same with spring tongues 79 formed by T-shaped slots 80 therein. From this point the oil is conveyed out of the brake casing by a pipe 81 of the differential casing 14. In order to further insure that the oil shall follow the path above described there is provided also in the interior of the brake housing 15 a ring 82 (Figure 27). This circulation of the oil produces an effective cooling through the distribution of heat by means of the differential housing and other parts. It will also be noted that at the rear end of the torque release member 38 there is an inwardly directed flange 83 to form the passageway 74 and that this flange 83 cooperates with a stop ring 84, (Figure 18) which is threaded to a rearward extension 19' of the inner driven shaft actuating member 19 held in place by a snap ring 85 (Figure 19), to limit the movement of the parts in the driving position of the same. A snap ring 48' (Figure 20) is provided to be placed in an internal recess in the rearward end of the disk-carrying member 43, as illustrated in Figure 13 and, as shown in Figure 29, serves as a stop member for limiting the forward travel of the disk-carrying member 43 with respect to the torque release member 38.

It will be understood that the driving shaft actuating member 23 and the driven shaft actuating member 19 are free to rotate relative to each other, but are held against axial movement. The rotation of the drive shaft 4 during the forward travel of the vehicle initially urges the stop member 29 in a rearward direction through the inter-engaging left-hand spirals between the driving shaft actuating member 23 and the stop member 29. But, since the stop member is prevented from further travel in a rearward direction by coming into a stopped position, the member 19 will be positively rotated since it is keyed to the stop member 29 and, therefore, the driven shaft 5 will be rotated at the speed of the drive shaft. If the vehicle tends to travel faster than the speed of the engine, the rotation of the driven shaft 5 faster than the drive shaft 4 will cause the stop member 29 to be moved forwardly through the cooperation of the left-hand spirals and a relative rotation will occur between the stop member 29 together with the inner actuating member 19 and the driving shaft actuating member 23. The movement of the stop member 29 in a forward direction is initially resisted by the drag release springs 31, which prevent movement of the stop member occasioned by throwing out the clutch in order to shift the gears in the transmission. The movement of the stop member in a forward direction is limited, as previously described, by engaging the spring seat ring 32. The rotation during forward travel of the vehicle of the stop member 29 and the inner actuating member 19 tends to urge the torque release member 38 through the cooperation of the right-hand spirals in a forward direction, but this movement is prevented by the stop flange 30 and, therefore, the torque release member 38 will be retained against the rear stop ring 84 which is secured to the inner actuating member 19 and is engaged by the flange 83 of the torque release member 38. Therefore, the torque release member 38, the springs 39 and the spring seat ring 40 will be rotated at the speed of the drive shaft. Any movement of the stop flange 30 in a forward direction will permit the torque release member 38 to be forwardly moved relative to the inner actuating member 19. The disk-carrying member 43 which is carried by the torque release member upon the rotation of the torque release member in a forward direction, will tend to move rearwardly through the inter-engaging left-hand spirals, but this movement is resisted by the torque release springs 39 since movement of the disk-carrying member in a rearward direction relative to the torque release member 38 would cause the flange 43ª to move the spring seat ring 40 and compress the torque release springs 39. Therefore, it will be understood that during the forward travel of the vehicle the disk-carrying member 43 always tends, through the movement of the parts, to move in such a direction as to release the pressure upon the braking plates but is held in rotative position by the strength of the torque release springs 39. When, however, the vehicle begins to travel faster than the speed of the engine and the driven shaft 5 is rotated ahead of the drive shaft 4, thus causing forward movement of the stop member 29 and forward movement of the torque release member 38, the torque release springs 39 will be compressed thereby building up the resistance which opposes the releasing movement of the disk-carrying member. The torque release member in its forward travel will come to a stop position by engaging the flange of the inner actuating member 19 and, therefore, the pressure upon the braking plates will be determined by degree of the compression of the torque release springs 39. By the adjustment of the stop ring 49, the degree of compression of the torque release springs 39 may be controlled. Thus in considering Figure 29 if the adjusting ring 49 is rotated so as to move forwardly, the freedom of movement of the brake plates will be increased and the disk-carrying member 43 will be forced in a forward direction by the springs 39 until it comes to a stop position by the engagement between the snap ring 48' and the torque release member. In such case, upon the forward travel of the torque release member, a certain amount of lost motion will be permitted before the braking plates are brought into frictional engagement and the springs 39 will then be compressed. On the other hand, if the brake ring is adjusted so as to initially apply a slight pressure to the brake rings, movement of the torque release member 39 in a forward direction will compress the springs 39 to a much greater extent. Therefore, any degree of braking pressure may be secured and this pressure will be developed when the rear wheels tend to travel faster than the speed of the engine and the momentum of the vehicle although utilized to develop the braking force cannot assist in producing a greater braking pressure than that determined by the character of the springs and the amount of compression.

As soon as the driven shaft is slowed down below the speed of the drive shaft so as to be again driven from the engine, the stop member will be moved rearwardly by winding into the driven shaft actuating member and the rearward movement of the stop member will serve to positively return the torque release member thereby releasing the pressure upon the friction disks. It will, therefore, be understood that as long as the operator maintains a pressure upon the accelerator so that the engine is driving the vehicle through the rear wheels, the brake will be held out of action but the operator may selectively control the speed of the vehicle without moving the foot from the accelerator since by releasing the accelerator in order to slow down the engine, the brake will be automatically brought into action and the vehicle will be slowed down to the speed of the engine. The engine, therefore, has the effect of a primary brake, selectively controllable by the operator through movement of the accelerator, and serving by retarding the drive shaft to bring the auxiliary brake automatically into action.

If the vehicle is traveling in a rearward direction, the stop member will be initially wound forward to the limit of its movement whereupon the driven shaft and the wheels of the vehicle will be rotated directly from the engine. The torque release member, however, will now tend to move rearwardly and is, therefore, held in rearward stop position as it is picked up and rotated. The disk-carrying member will tend to move forwardly but is prevented by the snap ring 48' which serves as a stop by engaging the torque release member. Therefore the brake is automatically maintained with the parts in released position during rearward travel of the vehicle. If the vehicle tends to travel faster than the speed of the engine during reverse movement, the stop member will be wound rearwardly but the brake will not be brought into action since the torque release member will still tend to move rearwardly and will be maintained in its stopped position.

The operator of the vehicle may at any time adjust the maximum braking torque from the adjusting means which extends closely adjacent the driver's position. It will be apparent that the maximum braking torque will be independent of the braking surfaces due to the fact that the torque release springs determine the pressure at which the braking plates are held in engagement.

While I have described my invention above in detail I wish it to be understood that many changes may be made therein without departing from the spirit of the same.

I claim:

1. In a braking device, the combination of a driving means, a driven means, a brake, connections between the brake and the above mentioned means to bring the brake into action when the relative speed of the driven means exceeds that of the driving means, and a torque controlling device for preventing a predetermined maximum torque effect being exceeded.

2. In a braking device, the combination of a driving means, a driven means, a brake, connections between the brake and the above mentioned means to bring the brake into action when the relative speed of the driven means exceeds that of the driving means, a torque controlling device for preventing a predetermined maximum torque effect being exceeded, and a device for adjusting the normal braking effect of said brake.

3. In a braking device, the combination of a driving means, a driven means, a brake, connections between the brake and the above mentioned means to bring the brake into action when the relative speed of the driven means exceeds that of the driving means, and a torque controlling device comprising a spring and an inclined surface cooperating therewith for preventing a predetermined maximum torque effect being exceeded.

4. In a braking device, the combination of a driving means, a driven means, a brake, connections between the brake and the above mentioned means to bring the brake into action when the relative speed of the driven means exceeds that of the driving means, a torque controlling device comprising a spring and an inclined surface cooperating therewith for preventing a predetermined maximum torque effect being exceeded, and a device for adjusting the normal braking effect of said brake.

5. In a braking device, the combination of a driving means, a driven means, a brake, connections between the brake and the above mentioned means to bring the brake into action when the relative speed of the driven means exceeds that of the driving means, and a torque controlling device comprising a spring and a spiral surface cooperating therewith for preventing a predetermined maximum torque effect being exceeded.

6. In a braking device, the combination of a driving means, a driven means, a brake, connections between the brake and the above mentioned means to bring the brake into action when the relative speed of the driven means exceeds that of the driving means, a torque controlling device comprising a spring and a spiral surface cooperating therewith for preventing a predetermined maximum torque effect being exceeded, and a device for adjusting the normal braking effect of said brake.

7. In a braking device, the combination of a driving means, a driven means, a brake, connections between the brake and the above mentioned means to bring the brake into action when the relative speed of the driven means exceeds that of the driving means, said brake being equipped to run in oil and provided with connections to the differential casing of the automobile to provide a circulation of the oil between the brake and the differential casing.

8. In a braking device, the combination of a driving means, a driven means, a brake, connections between the brake and the above mentioned means to bring the brake into action when the relative speed of the driven means exceeds that of the driving means, said brake being equipped to run in oil and provided with connections to the differential casing of the automobile to provide a circulation of the oil between the brake and the differential casing, said brake being located on the transmission in proximity to the differential casing.

9. In a braking device, the combination of a driving means, a driven means, a brake, connections between the brake and the above mentioned means to bring the brake into action when the relative speed of the driven means exceeds that of the driving means, said connections comprising an initial actuating spiral, a brake actuating spiral, and a torque release spiral.

10. In a braking device, the combination of a driving means, a driven means, a brake, connections between the brake and the above mentioned means to bring the brake into action when the relative speed of the driven means exceeds that of the driving means, said connections comprising an initial actuating spiral, a brake actuating spiral, a torque release spiral and a torque release spring cooperating therewith.

11. In a braking device, the combination of a driving means, a driven means, a brake, connections between the brake and the above mentioned means to bring the brake into action when the relative speed of the driven means exceeds that of the driving means, said connections comprising an initial actuating spiral, a brake actuating spiral, and a torque release spiral, said spirals being arranged concentrically.

12. In a braking device, the combination of a driving means, a driven means, a brake, connections between the brake and the above mentioned means to bring the brake into action when the relative speed of the driven means exceeds that of the driving means, said connections comprising an initial actuating spiral, a brake actuating spiral, a torque release spiral, said spirals being arranged concentrically, and a torque release spring cooperating therewith.

13. In a braking device, the combination of a driving means, a driven means, a brake, connections between the brake and the above mentioned means to bring the brake into action when the relative speed of the driven means exceeds that of the driving means, said connections comprising a drag release spring, an initial actuating spiral, a brake actuating spiral, and a torque release spiral.

14. In a braking device, the combination of a driving means, a driven means, a brake, connections between the brake and the above mentioned means to bring the brake into action when the relative speed of the driven means exceeds that of the driving means, said connections comprising a drag release spring, an initial actuating spiral, a brake actuating spiral, a torque release spiral and a torque release spring cooperating therewith.

15. In a braking device, the combination of a driving means, a driven means, a brake, connections between the brake and the above mentioned means to bring the brake into action when the relative speed of the driven means exceeds that of the driving means, said connections comprising a drag release spring carried by a movable stop member, an initial actuating spiral, a brake actuating spiral, and a torque release spiral.

16. In a braking device, the combination of a driving means, a driven means, a brake, connections between the brake and the above mentioned means to bring the brake into action when the relative speed of the driven means exceeds the speed of the driving means, said connections comprising a drag release spring carried by a movable stop member, an initial actuating spiral, a brake actuating spiral, a torque release spiral and a torque release spring cooperating therewith.

17. In a braking device, the combination of a driving means, a driven means, a brake, connections between the brake and the above mentioned means to bring the brake into action when the relative speed of the driven means exceeds that of the driving means, said connections comprising a drag release spring carried by a movable stop member splined to the actuating member which is connected to the driven means, an initial actuating spiral, a brake actuating spiral, and a torque release spiral.

18. In a braking device, the combination of a driving means, a driven means, a brake, connections between the brake and the above mentioned means to bring the brake into action when the relative speed of the driven means exceeds that of the driving means, said connections comprising a drag release spring carried by a movable stop member splined to the actuating member which is connected to the driven means, an initial actuating spiral, a brake actuating spiral, a torque release spiral and a torque release spring cooperating therewith.

19. In combination, a driven member positively rotated during the movement of a vehicle by being connected to move with a wheel of the vehicle, a member normally rotatable with said driven member but capable of retardation relative to said driven member selectively under the control of the operator, and means for applying a brake to said driven member actuated by the relative angular movement between said members, said means including a spiral sleeve axially displaceable with respect to said normally rotatable member.

20. Brake mechanism for vehicles comprising a shaft positively rotated during movement of the vehicle, a member mounted upon said shaft for normal rotation therewith, a sleeve splined to said shaft, said sleeve being thereby positively rotated with said shaft but capable of axial movement relative thereto, a spiral thread connection between said sleeve and said member whereby said member is capable of rotation relative to said shaft, a vehicle brake, and connections for bringing said brake into action upon axial movement of said sleeve.

21. Brake mechanism for vehicles comprising a shaft positively rotated during movement of the vehicle, a member mounted upon said shaft for normal rotation therewith, a sleeve splined to said shaft, said sleeve being thereby positively rotated with said shaft but capable of axial movement relative thereto, a spiral thread connection between said sleeve and said member whereby said member is capable of rotation relative to said shaft, a vehicle brake, and connections for bringing said brake into action upon axial movement of said sleeve, and brake release springs normally resisting the movement of said sleeve and holding said sleeve in retracted position.

22. A brake comprising rotatable frictional retarding members, means for moving said members into engagement, means for developing energy to apply said elements from the rotation of the element to be retarded, and means for resiliently limiting the torque developed by said brake.

23. In combination, a driven member, a brake for said driven member, said brake including elements moved into frictional engagement through the rotation of said driven member, and resilient means limiting the maximum torque developed by said brake.

24. An automobile braking system comprising, a driving means, a braking device, mechanical connections for bringing the braking device into action by a decrease of the speed of the driving means relative to the automobile and means for automatically throwing off the brake when driving the automobile backwardly without causing the automatic braking of the automobile throughout the speed range during the backward movement thereof.

25. An automobile braking system comprising, a driving means, driven means, a braking device, mechanical connections for bringing the braking device into action by a decrease of the speed of the driving means relative to the automobile, means for automatically throwing off the brake when driving the automobile backwardly and means for preventing the braking device from being brought into action by merely relatively slight forces applied to the driven means during differential speeds of the driving and driven means.

26. An automobile braking system comprising, a driving means, driven means, a braking device, mechanical connections for bringing the braking device into action by a decrease of the speed of the driving means relative to the automobile, means for automatically throwing off the brake when driving the automobile backwardly and a spring for preventing the braking device from being brought into action by merely relatively slight forces applied to the driven means during differential speeds of the driving and driven means.

27. A braking system comprising a driving means, a driven means, a brake for applying braking effect to the driven means during the differential speeds of movement of the driven means and driving means comprising a limiting means for limiting the braking effect of said brake to prevent excessive stresses being applied from the said brake.

28. In a braking device, the combination of a driving means, a driven means, coupling means permitting limited relative rotation therebetween, resilient means initially resisting the relative rotation between said driving and driven means by opposing movement of said coupling means, a brake for said driven means and means to bring the brake into action upon a relative rotation between said driving and driven means.

29. In a braking device, the combination of a driving means, a driven means, a relatively axially movable coupling means between said driving and driven means, movable to permit a limited relative rotation between said driving and driven means, resilient means normally holding said coupling means in driving position, an automatic brake for said driven means and means for holding said brake out of action by the normal position of the coupling means.

30. A brake mechanism for vehicles comprising a shaft positively rotated during movement of the vehicle, a member mounted on said shaft for normal rotation therewith, said member being stopped against axial movement in either direction with respect to said shaft, spiral thread connections between said shaft and said member permitting relative rotation therebetween, brake means for said vehicle and means for bringing said brake means into action upon a relative rotation between said shaft and said member.

31. In brake mechanisms for vehicles, a driven member positively rotated during the travel of the vehicle by being connected to move with a wheel of the vehicle, a member normally rotatable with said driven member but capable of retardation relative to said member selectively under the control of the operator, resilient means initially resisting relative rotation between said members, braking means for said driven member and means for bringing said braking means into action by the relative rotation between said members, said last named means including an axially displaceable sleeve spirally threaded to said normally rotatable but retardable member.

32. An automobile braking system comprising a driving means for driving the wheels of the vehicle, said driving means including coupling means permitting the movement of the automobile to drive the wheels ahead of the speed of the driving means, a braking device adapted to frictionally retard the automobile by acting through the wheels thereof, mechanical connections for bringing the braking device into action by a decrease in speed of the driving means relative to the automobile, said connections including means for automatically releasing the braking device when driving the automobile backwardly and preventing application of the braking device due to backward travel of the vehicle in excess of the speed of the driving means.

33. An automobile braking system comprising a driving means for driving the wheels of the vehicle, said driving means including mechanical connections for bringing mechanical braking means into action by decreasing the speed of the driving means relative to the automobile, a movable connection between the driving means and braking device allowing the driving means connected thereto to be relatively movable, resilient means initially resisting the movement of said movable connection and a driven means deriving its power directly from the driving means.

34. Braking mechanism comprising a driven shaft, a braking member coupled to be driven from said shaft through inclined surfaces tending to produce releasing movement of said member upon rotation of said shaft and resilient means acting upon said member in a direction opposing the releasing movement thereof in order to limit the maximum braking torque.

35. Braking mechanism comprising a driven shaft, a braking member coupled to be driven from said shaft through inclined surfaces tending to produce releasing movement thereof upon the rotation of said shaft, resilient means acting upon said member in a direction opposing the releasing movement thereof and an abutment for limiting the releasing movement of said member produced by the force of said resilient means.

36. Braking mechanism comprising a driven shaft, a braking member coupled to be driven from said shaft through inclined surfaces tending to produce releasing movement thereof by the rotation of said shaft, resilient means acting upon said member in a direction opposing the releasing movement thereof and means for transmitting brake applying movement to said member through said resilient means.

37. Braking mechanism comprising a driven shaft, a braking member coupled to be driven from said shaft through inclined surfaces tending to produce releasing movement thereof by the rotation of said shaft, resilient means acting upon said member in a direction opposing the releasing movement thereof, a second member in the drive between said braking member and said shaft and coupling means between said second member and said shaft comprising inclined surfaces tending to produce movement of said second member by the rotation of said shaft in a direction to move said braking member in a direction for braking.

38. Brake mechanism comprising a driven shaft, a braking member coupled to be driven from said shaft through inclined surfaces tending to produce releasing movement of said member by the rotation of said shaft, a second member through which the drive is transmitted from said shaft to said braking member, said second member being coupled to said shaft through inclined surfaces tending to produce movement of said second member in a direction for actuation of the brake by the rotation of said shaft, said second member being operable upon movement from the rotation of said shaft to move said first member in a direction for actuation of the brake and resilient means acting between said first and second members opposing the releasing movement of said first member and serving to limit the maximum braking torque.

39. In a brake construction, a driven shaft, rotatable braking means for said shaft, a brake applying member coupled to be driven from said shaft and rotate said braking means, said coupling between said shaft and said member including inclined surfaces tending to produce releasing movement of said brake applying member by the rotation of said shaft, resilient means acting upon said brake applying member in a direction opposing the releasing movement thereof and means for energizing said resilient means in a manner to transmit movement to said brake applying member through said resilient means by the rotation of said shaft to effect actuation of the brake.

40. Brake mechanism for vehicles comprising a propeller shaft extending from a fixed gear housing, a brake housing mounted concentric with said propeller shaft and secured to said gear housing, oil sealing means preventing the escape of oil from said brake housing, a non-rotatable brake plate within said brake housing guided for axial movement relative thereto, a rotatable brake plate yieldingly driven from said propeller shaft and means for bringing said brake plates into frictional engagement actuated by the rotation of said propeller shaft.

41. Friction gripping mechanism comprising a driven shaft, relatively rotatable friction members adapted to be brought into frictional engagement, means for driving one of said friction members from said shaft, comprising a first member relatively movable with respect to said shaft, inclined driving surfaces tending to urge said first member in a direction to produce the frictional engagement, a second member driven from said first member through oppositely inclined surfaces tending to produce releasing movement thereof and resilient means opposing the releasing movement and limiting the frictional torque transmitted between said friction members.

42. Brake mechanism for motor vehicles comprising, a selectively operable mechanical brake for retarding the travel of the vehicle, means for adjusting the maximum effectiveness of the brake and a control member for said adjusting means located adjacent to the operator of the vehicle.

43. In combination with a driving shaft and a driven shaft coaxially mounted for rotation, mutually cooperating means coupling said shafts for synchronous rotation in one direction for drive transmission from the driving to the driven shaft and permitting relative rotation therebetween when the driven shaft tends to drive the drive shaft, and axially directed force applying means for normally preventing rotation of the driven shaft at a speed greater than that of the driving shaft.

44. In combination with a driving shaft and a driven shaft coaxially mounted for rotation, mutually cooperating means coupling said shafts for synchronous rotation in one direction for drive transmission from the driving to the driven shaft and permitting relative rotation therebetween when the driven shaft tends to drive the drive shaft, and axially directed force applying means for automatically absorbing driving torque reacting through the driven shaft.

45. In combination, a drive shaft and a driven shaft co-axially mounted for rotation, means for transmitting a direct drive from said drive shaft to said driven shaft in one direction of rotation, said means permitting limited rotation of said driven shaft with respect to said drive shaft by an increase in speed of the driven shaft, resilient means acting longitudinally of said shafts for opposing such relative rotation and braking means brought into action by the relative rotation between said shafts acting to frictionally retard the rotation of said driven shaft.

46. In combination, a drive shaft and a driven shaft co-axially mounted for rotation, means for transmitting a direct drive from said drive shaft to said driven shaft in one direction of rotation, said means permitting a limited rotation of said driven shaft with respect to said drive shaft by an increase in speed of the driven shaft, said means comprising a pair of members having co-operating inclined surfaces for producing longitudinal movement therebetween upon a relative rotation of one of said members with respect to the other of said members, the first of said members being rigidly fixed to turn with one of said shafts and prevented from longitudinal movement, resilient means opposing the longitudinal movement of the second of said members and the relative rotation between said shafts and braking means for frictionally retarding the rotation of said driven shaft brought into action by the longitudinal movement of said second member.

47. A motor vehicle driving and braking system comprising a drive shaft, a driven shaft deriving rotation from the drive shaft for driving the wheels of the vehicle, said driven shaft being capable of limited rotation ahead of the drive shaft due to the momentum of the vehicle, braking means for the vehicle, a brake actuating element axially movable with respect to one of said shafts, resilient means for resisting the axial movement of said element and means for producing axial movement of said element by relative rotation between said shafts for causing said braking means to come into action to retard the driven shaft to the speed of the drive shaft.

48. A motor vehicle driving and braking system comprising a shaft through which the wheels of the vehicle are driven, braking means for the vehicle, an axially movable member for controlling the operation of said braking means mounted co-axially with respect to said shaft, resilient means for resisting the axial movement of said member in a direction to bring said braking means into action and means controllable by the operator for producing the axial movement of said member to bring said braking means into action.

49. In combination, two relatively movable members, means comprising a plurality of friction disks for producing a drag between them, and a release comprising a spring to control the drag by the force of the spring.

50. Brake mechanism comprising a driven shaft, a fixed brake housing mounted concentric with said shaft, a plurality of friction disks non-rotatably keyed to said brake housing but slidable laterally relative to said housing, a disk-carrying member rotatable by said driven shaft, a plurality of frictional disks keyed to said disk-carrying member and slidable laterally relative thereto, said rotatable friction disks being arranged alternatively with respect to said non-rotatable disks and means for applying pressure to said friction disks to retard the rotation of said disks actuated by energy received from the rotation of said driven shaft.

51. Brake mechanism comprising a driven shaft, a fixed brake housing mounted concentric with said shaft, a disk-carrying member rotatable by said shaft within said brake housing, a plurality of friction disks alternatively keyed to said brake housing and said disk-carrying member and slidable laterally relative thereto to be brought into frictional engagement, means for moving said frictional disks into frictional engagement by the rotation of said driven shaft and means for limiting the maximum frictional torque developed.

52. Brake mechanism for motor vehicles comprising, in combination, a driven shaft extending into the differential casing of the automobile, a fixed brake housing secured to said differential casing, a disk-carrying member within said brake housing rotatable from said shaft, a plurality of friction disks alternatively keyed to said brake housing and said disk-carrying member, means for producing lateral movement of said disk-carrying member to bring said disks into engagement by the rotation of said driven shaft and means for normally holding said disk-carrying member against lateral movement.

53. Brake mechanism comprising a fixed brake housing, a driven element within said housing, a plurality of friction disks alternatively keyed to said housing and said element and slidable laterally relative thereto, an abutment on said housing, an abutment on said element, said friction disks being positioned between said abutments and adapted to be compressed by relative lateral movement of said element with respect to said housing, a rotatable member coupled to said element through inclined surfaces, resilient means acting to produce lateral separation between said element and said member through relative rotation therebetween and means for producing lateral movement of said rotatable member in a direction to produce compression of said friction disks between said abutments whereby the torque between said housing and said element is limited by said resilient means.

54. Brake mechanism comprising a fixed brake housing, a driven element within said housing, a plurality of friction disks alternatively keyed to said housing and said element and slidable laterally with respect thereto, an abutment adjustably secured to said brake housing, an abutment carried by said element, said friction disks being positioned between said abutments, a rotatable member coupled to said element with spiral threads, resilient means acting to produce longitudinal separation between said rotatable member and said element and means for moving said rotatable member in a direction to produce compression of said friction disks between said abutments whereby the braking torque is limited by the force of said resilient means.

55. Brake mechanism comprising a fixed brake housing, a driven element within said housing, means comprising a plurality of friction disks for producing a drag between said housing and said element, a rotatable member spirally coupled to said element, a rotatable shaft oppositely spiralled to said rotatable member whereby upon rotation of said shaft in one direction, said rotatable member tends to move laterally with respect to said shaft in a direction to produce compression of said friction disks through movement of said driven element and said driven element tends to move in the opposite direction relative to said rotatable member, resilient means for resisting the opposite movement of said driven element whereby said resilient means limits the torque thereof and means normally holding said rotatable member against lateral movement upon rotation of said shaft whereby movement of said last-named means automatically brings the brake into action.

EDWARD A. ROCKWELL.